(12) United States Patent
Kondo et al.

(10) Patent No.: US 11,453,390 B2
(45) Date of Patent: Sep. 27, 2022

(54) DRIVING SUPPORT APPARATUS

(71) Applicant: DENSO CORPORATION, Kariya (JP)

(72) Inventors: Katsuhiko Kondo, Nisshin (JP);
Yusuke Akamine, Nisshin (JP);
Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 278 days.

(21) Appl. No.: 16/526,062

(22) Filed: Jul. 30, 2019

(65) Prior Publication Data

US 2019/0351898 A1 Nov. 21, 2019

Related U.S. Application Data

(63) Continuation of application No. PCT/JP2018/000864, filed on Jan. 15, 2018.

(30) Foreign Application Priority Data

Feb. 1, 2017 (JP) .............................. JP2017-016834

(51) Int. Cl.
*B60W 30/09* (2012.01)
*B60W 10/04* (2006.01)
*B60W 10/18* (2012.01)
*B60W 10/20* (2006.01)
*B60W 30/095* (2012.01)

(52) U.S. Cl.
CPC ............ *B60W 30/09* (2013.01); *B60W 10/04* (2013.01); *B60W 10/18* (2013.01); *B60W 10/20* (2013.01); *B60W 30/095* (2013.01); *B60W 2400/00* (2013.01); *B60W 2540/12* (2013.01); *B60W 2554/00* (2020.02); *B60W 2710/20* (2013.01); *B60W 2720/106* (2013.01)

(58) Field of Classification Search
CPC ...... B60W 30/09; B60W 10/04; B60W 10/18; B60W 10/20; B60W 30/095; B60W 2400/00; B60W 2540/12; B60W 2720/106; B60W 2710/20–202
See application file for complete search history.

(56) References Cited

U.S. PATENT DOCUMENTS

2003/0060936 A1* 3/2003 Yamamura ........... B60K 26/021
701/1
2010/0134263 A1* 6/2010 Mathony ................ G08G 1/161
340/435

(Continued)

FOREIGN PATENT DOCUMENTS

JP 4239809 B2 3/2009
KR 1994-0000039 B1 * 1/1994 ............ B60W 30/18

*Primary Examiner* — Genna M Mott
(74) *Attorney, Agent, or Firm* — Maschoff Brennan

(57) ABSTRACT

A driving support apparatus supports driving of the vehicle. The driving support apparatus includes a brake pedal detection unit, a retraction speed calculation unit and a driving operation device setting unit. The brake pedal detection unit detects an operation amount of the brake pedal. The retraction speed calculation unit calculates a retraction speed of the brake pedal, based on the operation amount of the brake pedal detected by the brake pedal detection unit. The driving operation device setting unit sets a reaction force exerted by a driving operation device to a larger value as the retraction speed calculated by the retraction speed calculation unit becomes higher.

11 Claims, 7 Drawing Sheets

(56) References Cited

U.S. PATENT DOCUMENTS

| | | | | |
|---|---|---|---|---|
| 2011/0115281 A1* | 5/2011 | Jeon | ............ | B60T 1/10 |
| | | | | 303/3 |
| 2016/0101731 A1* | 4/2016 | Matsuoka | ............ | B60Q 9/008 |
| | | | | 340/435 |
| 2018/0345973 A1* | 12/2018 | Krueger | ............ | B60W 10/06 |
| 2019/0178375 A1* | 6/2019 | Giorgio Bort | ............ | F16H 61/468 |

\* cited by examiner

DRIVING SUPPORT APPARATUS

CROSS-REFERENCE TO RELATED APPLICATION

This application is a bypass application of International Application No. PCT/JP2018/000864 filed Jan. 15, 2018 which designated the U.S. and claims priority to Japanese Patent Application No. 2017-16834 filed on Feb. 1, 2017, the contents of which are incorporated herein by reference.

TECHNICAL FIELD

The present disclosure relates to a driving support apparatus.

BACKGROUND

According to the technique disclosed in JP 4239809 B, the driver's intention is estimated based on the surrounding environment and the history of change in manipulation amount of a driving operation device. Then, a future state is predicted assuming that the vehicle is operated according to the estimated driver's intention. Then, based on the future state, a risk that is assumed from the driver's intention is evaluated. Then, a reaction force exerted by the driving operation device is determined based on the risk.

SUMMARY

An aspect of the present disclosure is a driving support apparatus that supports driving of the vehicle. The driving support apparatus includes a brake pedal detection unit, a retraction speed calculation unit, and a driving operation device setting unit.

The brake pedal detection unit detects an operation amount of the brake pedal. The retraction speed calculation unit calculates a retraction speed of the brake pedal, based on the operation amount of the brake pedal detected by the brake pedal detection unit. The driving operation device setting unit sets a reaction force exerted by a driving operation device. The driving operation device setting unit sets a reaction force so as a driving operation device to a larger value, as the retraction speed calculated by the retraction speed calculation unit becomes higher.

DETAILED DESCRIPTION OF THE PREFERRED EMBODIMENTS

As a result of extensive research, some issues were found as set forth below. According to the technique described in JP 4239809 B, a reaction force exerted by a driving operation device is determined through a complicated process. Therefore, depending on the situation the vehicle has encountered, there is not always a sufficient time for determining a reaction force exerted by a driving operation device. In an aspect of the present disclosure, it is preferred to provide a driving support apparatus which is capable of setting a reaction force exerted by a driving operation device at an earlier stage.

An aspect of the present disclosure is a driving support apparatus that supports driving of the vehicle. The driving support apparatus includes a brake pedal detection unit, a retraction speed calculation unit, and a driving operation device setting unit.

The brake pedal detection unit detects an operation amount of the brake pedal. The retraction speed calculation unit calculates a retraction speed of the brake pedal, based on the operation amount of the brake pedal detected by the brake pedal detection unit. The driving operation device setting unit sets a reaction force exerted by a driving operation device. The driving operation device setting unit sets a reaction force exerted by a driving operation device to a larger value, as the retraction speed calculated by the retraction speed calculation unit becomes higher.

The driving support apparatus that is an aspect of the present disclosure makes the reaction force exerted by the driving operation device larger, as the retraction speed of the brake pedal becomes higher. Therefore, for example, the brake pedal is prevented from being rapidly retracted by the driver for rapid operation of the driving operation device.

According to the driving support apparatus that is an aspect of the present disclosure, no complicated process is involved in determining a reaction force exerted by a driving operation device. Therefore, a reaction force exerted by a driving operation device can be set at an earlier stage.

The bracketed reference signs in the claims indicate correspondence with the specific means described in the following embodiments, which are each described as a mode, and should not limit the technical scope of the present disclosure.

Hereinafter, embodiments of the present disclosure will be described with reference to the drawings.

First Embodiment

1. Configuration of Driving Support Apparatus 1

Figure 1:
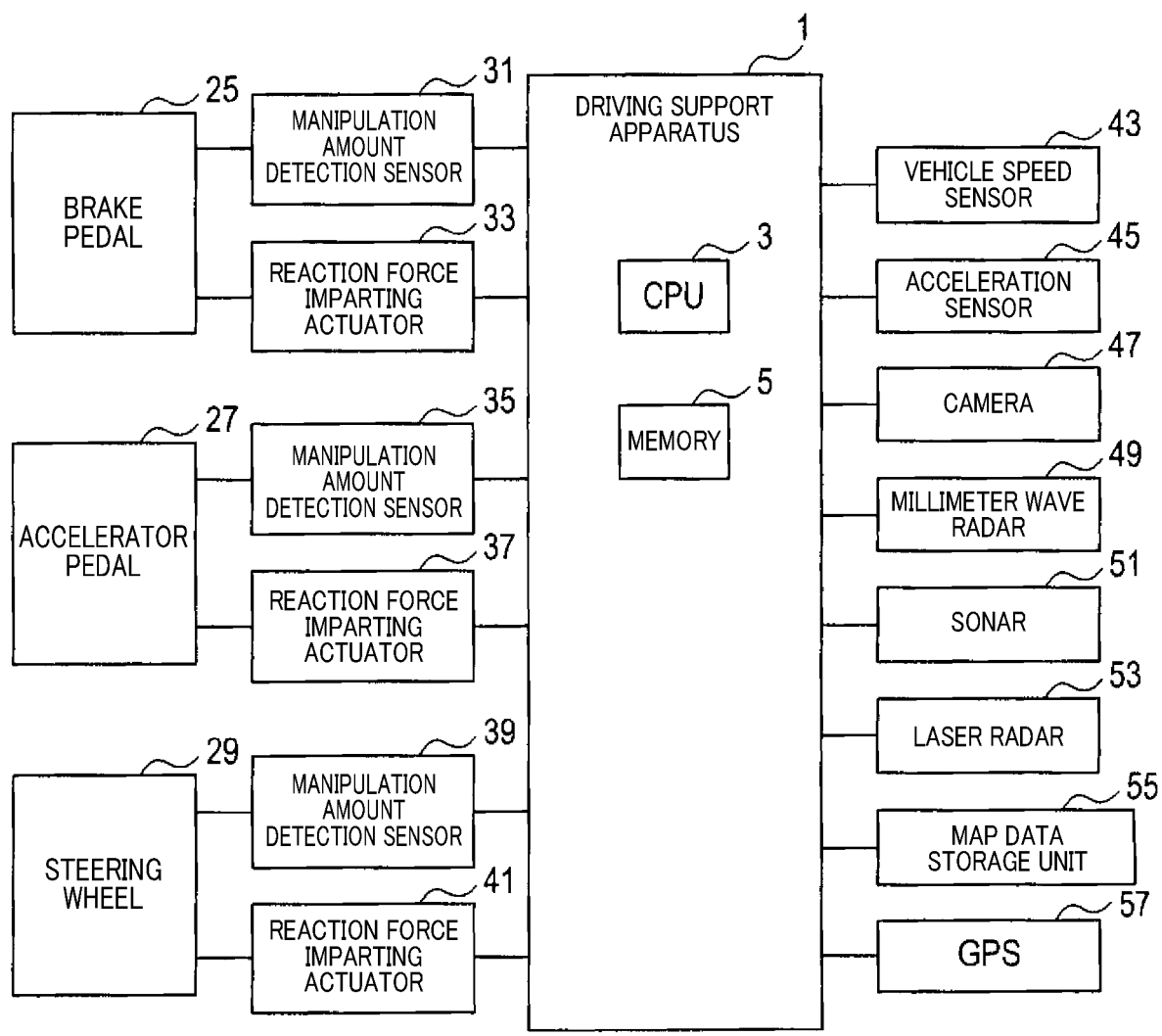
FIG. 1 is a block diagram illustrating a configuration of a driving support apparatus.
Figure 2:
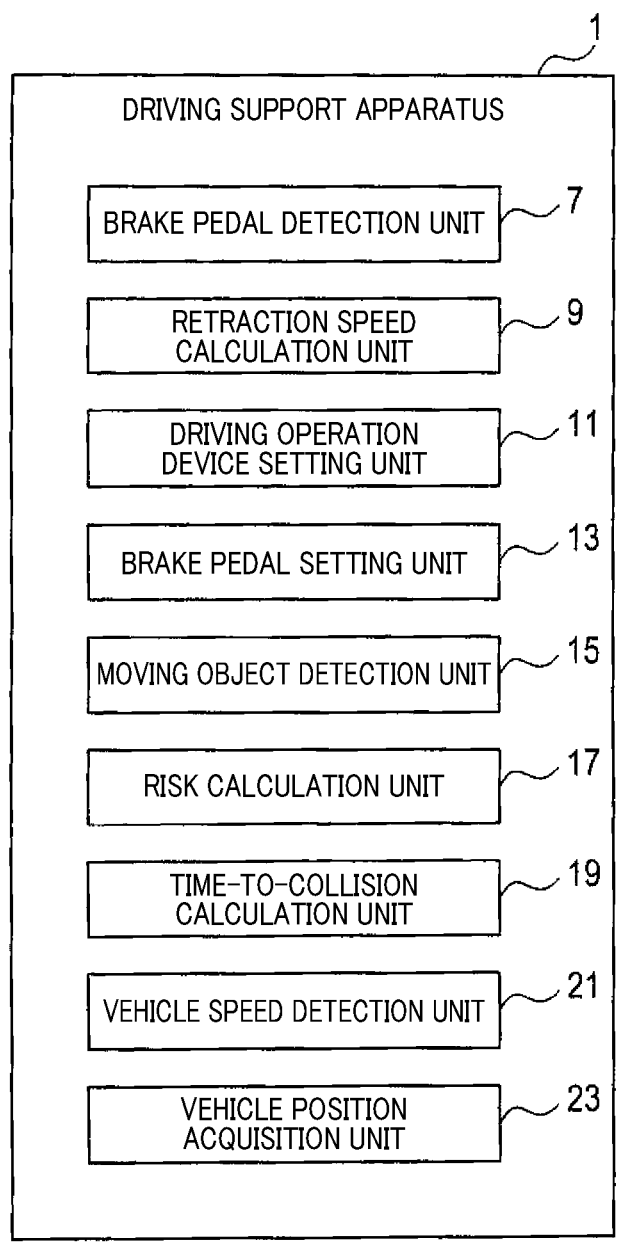
FIG. 2 is a block diagram illustrating a functional configuration of the driving support apparatus.

Referring to FIGS. 1 and 2, a configuration of a driving support apparatus 1 will be described. The driving support apparatus 1 is an apparatus installed in a vehicle. The following description explains a vehicle in which the driving support apparatus 1 is installed.

As shown in FIG. 1, the driving support apparatus 1 is mainly configured by a well-known microcomputer that includes a CPU 3 and a semiconductor memory such as a RAM, a ROM, or a flash memory (hereinafter, referred to as a memory 5). The driving support apparatus 1 has various functions which are implemented by the CPU 3 executing programs stored in a non-transitory tangible recording medium. In this example, the memory 5 corresponds to the non-transitory tangible recording medium in which the programs are stored. With these programs being executed, methods corresponding to the programs are executed. The driving support apparatus 1 may be configured by one or more computers. The memory 5 includes specific positions, functions $K_0$ to $K_3$, and a function $K_B$, which will be described later.

The driving support apparatus 1 has a functional configuration which is implemented by the CPU 3 executing the programs. As shown in FIG. 2, the functional configuration includes a brake pedal detection unit 7, a retraction speed calculation unit 9, a driving operation device setting unit 11, a brake pedal setting unit 13, a moving object detection unit 15, a risk calculation unit 17, a time-to-collision calculation unit 19, a vehicle speed detection unit 21, and a vehicle position acquisition unit 23.

The method of implementing these elements constituting the driving support apparatus 1 should not be limited to a software-based method. The method may be implemented by using one or more hardware components for a part or all of the elements. For example, if the above functions are implemented by one or more electronic circuits as hardware components, the electronic circuits may each be implemented by a digital circuit including a number of logic circuits, or an analog circuit, or a combination of a digital circuit and an analog circuit.

As shown in FIG. 1, in addition to the driving support apparatus 1, the vehicle includes a brake pedal 25, an accelerator pedal 27, a steering wheel 29, operation amount detection sensors 31, 35 and 39, reaction force imparting actuators 33, 37 and 41, a vehicle speed sensor 43, a acceleration sensor 45, a camera 47, a millimeter wave radar 49, a sonar 51, a laser radar 53, a map data storage unit 55, and a GPS 57.

The operation amount detection sensor 31 detects an operation amount of the brake pedal 25. The operation amount detection sensor 35 detects an operation amount of the accelerator pedal 27. The operation amount detection sensor 39 detects an operation amount of the steering wheel 29.

The reaction force imparting actuator 33 imparts a reaction force to the brake pedal 25.

The reaction force imparting actuator 37 imparts a reaction force to the accelerator pedal 27. The reaction force imparting actuator 41 imparts a reaction force to the steering wheel 29.

The vehicle speed sensor 43 detects a speed of the vehicle (hereinafter, referred to as vehicle speed). The acceleration sensor 45 detects an acceleration of the vehicle. The camera 47 captures and produces an image around the vehicle. The camera 47 transmits the produced image to the driving support apparatus 1. The millimeter wave radar 49, the sonar 51 and the laser radar 53 each detect a moving object around the vehicle. For example, the moving object may be another vehicle, a pedestrian, or the like. The map data storage unit 55 includes storage of map data. The map data include positions of roads, intersections, planimetric features, and the like. The GPS 57 acquires a position of the vehicle.

2. Process Performed by the Driving Support Apparatus 1

Figure 3:
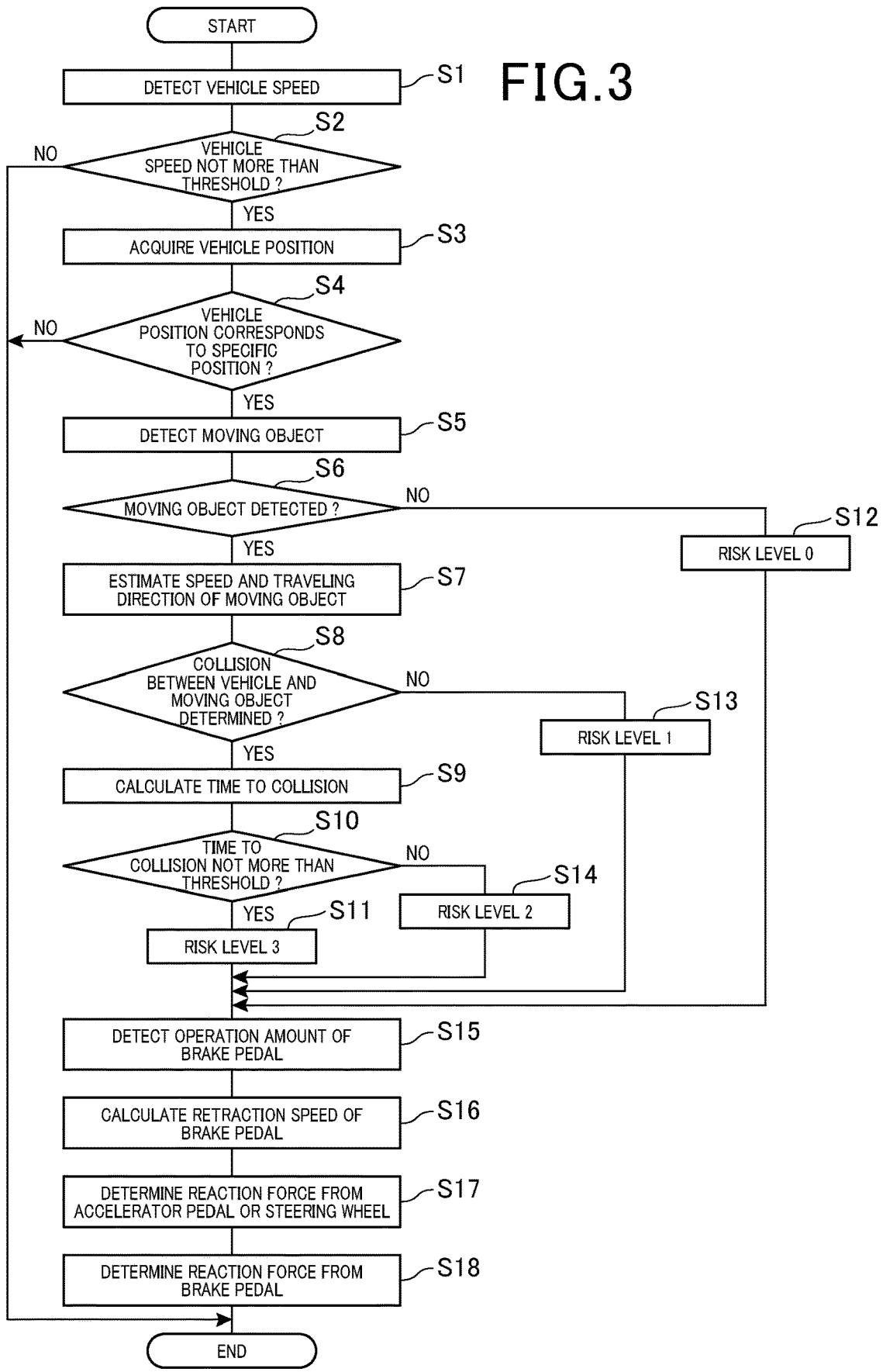
FIG. 3 is a flow diagram illustrating a process performed by the driving support apparatus.
Figure 4:
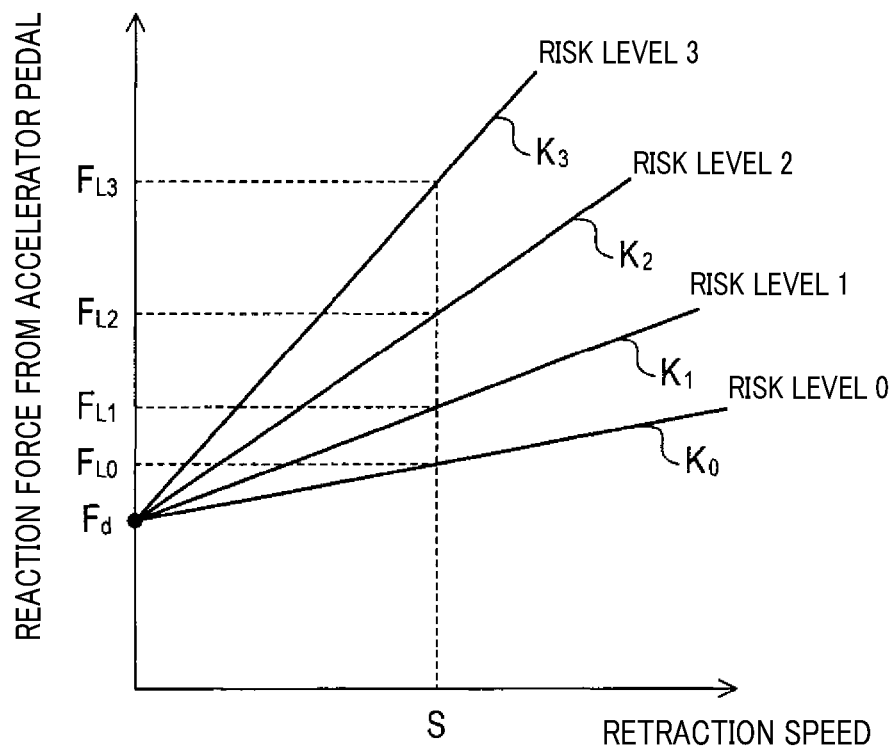
FIG. 4 is a diagram showing functions that define a relationship between retraction speed of a brake pedal and reaction force of an accelerator pedal.
Figure 5:
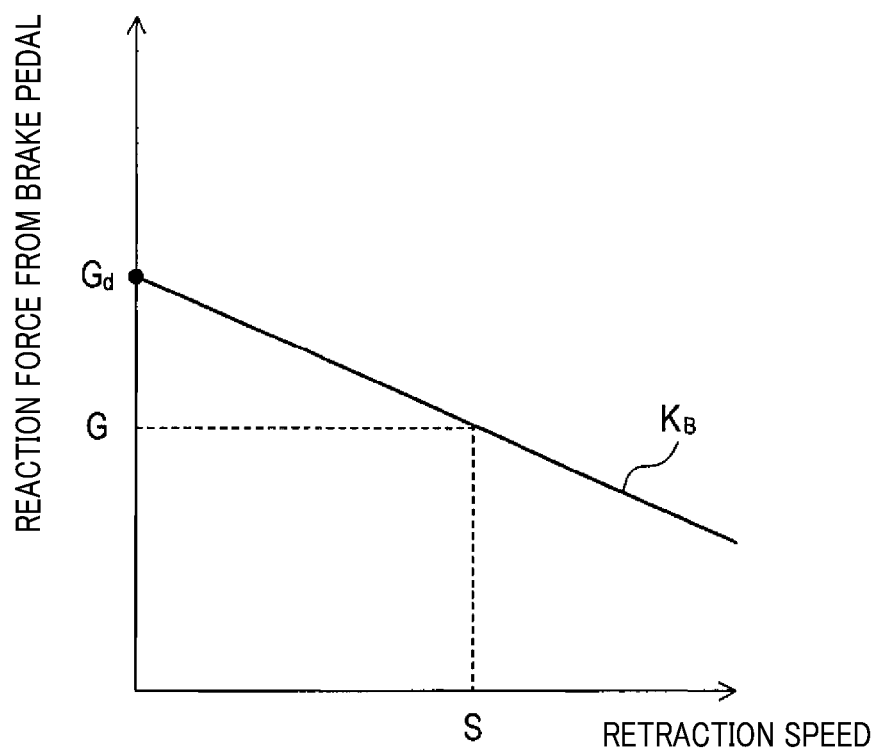
FIG. 5 is a diagram showing a function that defines a relationship between retraction speed and reaction force of a brake pedal.

Referring to FIGS. 3 to 5, a process iterated by the driving support apparatus 1 at predetermined intervals will be described. At step 1 of FIG. 3, the vehicle speed detection unit 21 detects a vehicle speed by using the vehicle speed sensor 43.

At step 2, the driving operation device setting unit 11 determines whether the vehicle speed detected at step 1 is not more than a predetermined threshold. If the vehicle speed is not more than the threshold, the process proceeds to step 3, and if the vehicle speed exceeds the threshold, the present process ends. When ending the present process, reaction forces of the accelerator pedal 27, the brake pedal 25 and the steering wheel 29 are reset to the respective default values.

At step 3, the vehicle position acquisition unit 23 acquires a vehicle position by using the map data stored in the map data storage unit 55, and the GPS 57.

At step 4, the driving operation device setting unit 11 determines whether the vehicle position acquired at step 3 corresponds to a specific position stored in the memory 5 in advance. The specific position may, for example, be a position of an intersection or a position in the surroundings of the intersection. If the vehicle position corresponds to a specific position, the process proceeds to step 5, and if not, the present process ends. When ending the present process, reaction forces of the accelerator pedal 27, the brake pedal 25 and the steering wheel 29 are reset to the respective default values.

At step 5, the moving object detection unit 15 detects a moving object around the vehicle by using the camera 47, the millimeter wave radar 49, the sonar 51 and the laser radar 53.

At step 6, the moving object detection unit 15 determines whether a moving object has been detected at step 5. If a moving object has been detected, the process proceeds to step 7, and if not, the process proceeds to step 12.

At step 7, the moving object detection unit 15 estimates a speed and a traveling direction of the detected moving object by using the output signals of the camera 47, the millimeter wave radar 49, the sonar 51 and the laser radar 53.

At step 8, the risk calculation unit 17 determines whether the moving object collides with the vehicle in the future, based on the speed and the traveling direction of the moving object estimated at step 7.

Specifically, the risk calculation unit 17 calculates a predicted trajectory of the moving object in the future, based on the speed and the traveling direction of the moving object. The risk calculation unit 17 also calculates a predicted trajectory of the vehicle in the future, based on the vehicle speed and the traveling direction. Then, when the predicted trajectory of the moving object crosses that of the vehicle at the same time, the risk calculation unit 17 determines that the moving object collides with the vehicle in the future, or otherwise, determines that they do not collide with each other.

If the moving object is determined to collide with the vehicle in the future, the process proceeds to step 9, and if not, the process proceeds to step 13. It should be noted that determining collision of the moving object with the vehicle in the future corresponds to calculating a large value of a risk of collision.

At step 9, the time-to-collision calculation unit 19 calculates a time to collision. The time to collision refers to a duration of time from the current time point to a time point when the vehicle and the moving object will collide with each other in the future. The time-to-collision calculation unit 19 calculates a time to collision, based on the predicted trajectory of the moving object in the future and that of the vehicle in the future calculated in above-mentioned step 8.

At step 10, the risk calculation unit 17 determines whether the time to collision calculated at step 9 is not more than a predetermined threshold. If the time to collision is not more than the threshold, the process proceeds to step 11, and if the time to collision exceeds the threshold, the process proceeds to step 14.

At step 11, the risk calculation unit 17 sets the risk level to 3. If a negative determination is made at step 10, the process proceeds to step 14 where the risk calculation unit 17 sets risk level to 2. If a negative determination is made at step 8, the process proceeds to step 13 where the risk calculation unit 17 sets risk level to 1. If a negative determination is made at step 6, the process proceeds to step 12 where the risk calculation unit 17 sets risk level to 0.

At step 15, the brake pedal detection unit 7 detects an operation amount of the brake pedal 25. The operation amount of the brake pedal 25 refers to a difference between the position of the brake pedal 25 when not operated and the current position of the brake pedal 25.

At step 16, the retraction speed calculation unit 9 calculates a retraction speed of the brake pedal 25, based on the operation amount of the brake pedal 25 detected at step 15. The retraction speed refers to a speed of operating the brake pedal 25 when the operation amount of the brake pedal 25 is decreasing. First, the instantaneous retraction speed of the brake pedal 25 is calculated by the retraction speed calculation unit 9 from the difference between the operation amount of the brake pedal 25 detected at the immediately preceding step 15 and the operation amount of the brake pedal 25 detected at the previous step 15. Then, the retraction speed calculation unit 9 calculates an average value or a maximum value of the instantaneous retraction speeds of the brake pedal 25 that have been repeatedly calculated as described above in a predetermined period, for use as a retraction speed of the brake pedal 25. The predetermined period, for example, is a period having a predetermined length.

At step 17, the driving operation device setting unit 11 sets a reaction force between the accelerator pedal 27 and the steering wheel 29. First, setting of a reaction force of the accelerator pedal 27 will be described.

The memory 5 includes prior storage of functions $K_0$ to $K_3$ shown in FIG. 4. The functions $K_0$ to $K_3$ each define a relationship between retraction speed of the brake pedal 25 and reaction force of the accelerator pedal 27. When the retraction speed of the brake pedal 25 is 0, the reaction force of the accelerator pedal 27 is $F_d$ in any of the functions $K_0$ to $K_3$. $F_d$ is a default value. In any of the functions $K_0$ to $K_3$, as the retraction speed of the brake pedal 25 becomes higher, the reaction force of the accelerator pedal 27 becomes larger. It should be noted that the reaction force at the time of depressing the brake pedal 25 is $F_d$.

When the functions $K_0$ to $K_3$ are compared in terms of gradient, the function $K_3$ has the largest gradient, the function $K_2$ has the secondly large gradient, the function $K_1$ has the thirdly large gradient, and the function $K_0$ has the smallest gradient. The gradient refers to the rate of increase of reaction force when retraction speed has increased on a unit-amount basis.

The retraction speed is assumed as S, as shown in FIG. 4, S is a positive value. In this case, the reaction forces of the accelerator pedal 27 defined by the functions $K_0$ to $K_3$ are $F_{L0}$, $F_{L1}$, $F_{L2}$ and $F_{L3}$, respectively. $F_{L0}$ is larger than $F_d$. $F_{L1}$ is larger than $F_{L0}$. $F_{L2}$ is larger than $F_{L1}$. $F_{L3}$ is larger than $F_{L2}$.

When risk level is set to 0 at step 12, the driving operation device setting unit 11 applies the retraction speed of the brake pedal 25 calculated at step 16 to the function $K_0$ to set a reaction force of the accelerator pedal 27.

When risk level is set to 1 at step 13, the driving operation device setting unit 11 applies the retraction speed of the brake pedal 25 calculated at step 16 to the function $K_1$ to set a reaction force of the accelerator pedal 27.

When risk level is set to 2 at step 14, the driving operation device setting unit 11 applies the retraction speed of the brake pedal 25 calculated at step 16 to the function $K_2$ to set a reaction force of the accelerator pedal 27.

When risk level is set to 3 at step 11, the driving operation device setting unit 11 applies the retraction speed of the brake pedal 25 calculated at step 16 to the function $K_3$ to set a reaction force of the accelerator pedal 27. The reaction force imparting actuator 37 imparts a set reaction force to the accelerator pedal 27.

The driving operation device setting unit 11 sets a reaction force of the steering wheel 29 as in the case of setting a reaction force of the accelerator pedal 27. The reaction force imparting actuator 41 imparts a set reaction force to the steering wheel 29. The reaction force of the steering wheel 29 becomes larger as the retraction speed of the brake pedal 25 becomes higher. Also, the reaction force of the steering wheel 29 becomes larger as the risk level determined at step 11, 12, 13 or 14 becomes higher.

After lapse of a predetermined period from completing the operation of the brake pedal 25, the driving operation device setting unit 11 resets the reaction force of the accelerator pedal 27 or the steering wheel 29 to the default value. The predetermined period, for example, is a period having a predetermined length.

At step 18, the brake pedal setting unit 13 sets a reaction force of the brake pedal 25.

The memory 5 includes prior storage of a function $K_B$ shown in FIG. 5. The function $K_B$ defines a relationship between retraction speed and reaction force of the brake pedal 25. When the retraction speed of the brake pedal 25 is 0, the reaction force of the brake pedal 25 is $G_d$. $G_d$ is a default value. As the retraction speed of the brake pedal 25 becomes higher, the reaction force of the brake pedal 25 becomes smaller. At the time of depressing the brake pedal 25, the reaction force of the brake pedal 25 is Ga.

The retraction speed is assumed as S, as shown in FIG. 5, and S is a positive value. In this case, the reaction force of the brake pedal 25 defined by the function $K_B$ is G. G is smaller than Ga.

The brake pedal setting unit 13 applies the retraction speed of the brake pedal 25 calculated at step 16 to the function $K_B$ to set a reaction force of the brake pedal 25. The reaction force imparting actuator 33 imparts a set reaction force to the brake pedal 25.

3. Advantageous Effects of the Driving Support Apparatus 1

(1A) The driving support apparatus 1 applies the retraction speed of the brake pedal 25 to any one of the functions $K_0$ to $K_3$ of FIG. 4 to set a reaction force of the accelerator pedal 27. The functions $K_0$ to $K_3$ all have positive gradients. Therefore, as the retraction speed of the brake pedal 25 becomes higher, the reaction force of the accelerator pedal 27 becomes larger. Similarly, the higher the retraction speed of the brake pedal 25, the larger the reaction force of the steering wheel 29.

Thus, for example, the brake pedal 25 is prevented from being rapidly retracted by the driver for rapid operation of the accelerator pedal 27 or the steering wheel 29.

(1B) According to the driving support apparatus 1, no complicated process is involved in setting a reaction force of the accelerator pedal 27 or the steering wheel 29. Thus, a reaction force of the accelerator pedal 27 or the steering wheel 29 can be set at an earlier stage.

(1C) The driving support apparatus 1 applies the retraction speed of the brake pedal 25 to the function $K_B$ of FIG. 5 to set a reaction force of the brake pedal 25. The function $K_B$ has a negative gradient. Therefore, as the retraction speed of the brake pedal 25 becomes higher, the reaction force of the brake pedal 25 becomes smaller. Consequently, the brake pedal 25 is prevented from being rapidly retracted by the driver.

(1D) When a moving object is determined to be detected at step 5, the driving support apparatus 1 sets risk level to any one of 1 to 3 and sets a reaction force of the accelerator pedal 27 or the steering wheel 29 by using any one of the functions $K_1$ to $K_3$.

When no moving object is determined to be detected at step 5, the driving support apparatus 1 sets risk level to 0 and sets a reaction force of the accelerator pedal 27 or the steering wheel 29 by using the function $K_0$.

The reaction force of the accelerator pedal 27 or the steering wheel 29 determined by using any one of the functions $K_1$ to $K_3$ is larger than the reaction force determined by using the function $K_0$. Thus, when a moving object is detected, the driving support apparatus 1 sets the reaction force of the accelerator pedal 27 or the steering wheel 29 to a larger value than when no moving object is detected. Consequently, the driving support apparatus 1 can reduce the risk of the vehicle colliding with the moving object.

Figure 6:
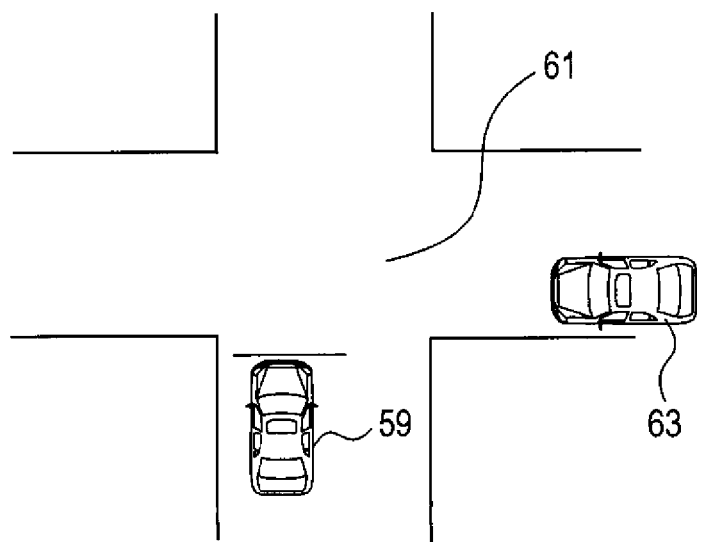
FIG. 6 is a diagram illustrating an effect exerted by the driving support apparatus.

For example, as shown in FIG. 6, a situation is assumed where a vehicle 59 stops short of an intersection 61 and another vehicle 63 is about to enter the intersection 61 from the right.

When the vehicle 63 is detected, the driving support apparatus 1 sets the reaction force of the accelerator pedal 27 or the steering wheel 29 to a larger value than in a case where the vehicle 63 is not detected. Consequently, the driving support apparatus 1 can reduce the risk of the vehicle 59 entering the intersection 61 and colliding with the vehicle 63.

Figure 7:
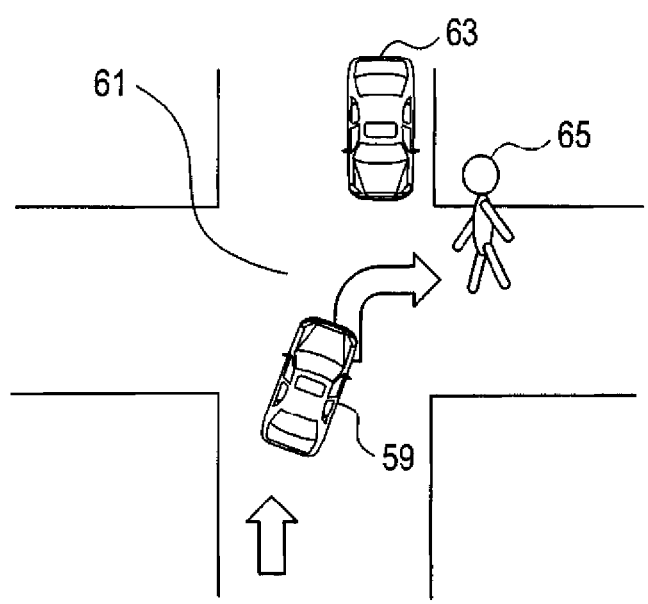
FIG. 7 is a diagram illustrating an effect exerted by the driving support apparatus.

As shown in FIG. 7, a situation is assumed where a vehicle 59 is about to turn right at an intersection 61. It is further assumed that, in this situation, there is a pedestrian 65 in the traveling direction of the vehicle 59 and there is another vehicle 63 entering the intersection 61 from the opposite lane.

When the vehicle 63 or the pedestrian 65 is detected, the driving support apparatus 1 sets the reaction force of the accelerator pedal 27 or the steering wheel 29 to a larger value than in a case where the vehicle 63 or the pedestrian 65 is not detected. Consequently, the driving support apparatus 1 can reduce the risk of the vehicle 59 turning right and colliding with the vehicle 63 or the pedestrian 65.

(1E) When a future collision between a moving object and the vehicle is determined at step 8, the driving support apparatus 1 sets risk level to 2 or 3 and sets a reaction force of the accelerator pedal 27 or the steering wheel 29 by using either of the functions $K_2$ and $K_3$.

When it is determined that no future collision will occur between a moving object and the vehicle at step 8, the driving support apparatus 1 sets risk level to 1 and sets a reaction force of the accelerator pedal 27 or the steering wheel 29 by using the function $K_1$.

The reaction force of the accelerator pedal 27 or the steering wheel 29 determined by using either of the functions $K_2$ and $K_3$ is larger than the reaction force determined by using the function $K_1$. Thus, when a future collision is determined to occur between a moving object and the vehicle, the driving support apparatus 1 sets the reaction force of the accelerator pedal 27 or the steering wheel 29 to an even larger value than when no moving object is detected. Consequently, the driving support apparatus 1 can even more reduce the risk of the vehicle colliding with the moving object.

(1F) The driving support apparatus 1 calculates, at step 9, a time to collision that is a duration of time before the occurrence of a collision between a moving object and the vehicle. If the time to collision is determined to be not more than a threshold at step 10, the driving support apparatus 1 sets risk level to 3 and sets a reaction force of the accelerator pedal 27 or the steering wheel 29 by using the function $K_3$.

If the time to collision is determined to exceed the threshold at step 10, the driving support apparatus 1 sets risk level to 2 and sets a reaction force of the accelerator pedal 27 or the steering wheel 29 by using the function $K_2$.

The reaction force of the accelerator pedal 27 or the steering wheel 29 determined by using the function $K_3$ is larger than the reaction force determined by using the function $K_2$. Therefore, the driving support apparatus 1 sets the reaction force of the accelerator pedal 27 or the steering wheel 29 to a larger value as the time to collision becomes shorter. Consequently, the driving support apparatus 1 can even more reduce the risk of the vehicle colliding with the moving object.

(1G) The driving support apparatus 1 detects a vehicle speed. When the detected vehicle speed is not more than a threshold, the driving support apparatus 1 may apply the retraction speed of the brake pedal 25 to any one of the functions $K_0$ to $K_3$ to set a reaction force of the accelerator pedal 27 or the steering wheel 29.

When the detected vehicle speed exceeds the threshold, the driving support apparatus 1 resets the reaction force of the accelerator pedal 27 or the steering wheel 29 to the default value. The default value is smaller than the value obtained by applying the retraction speed of the brake pedal 25 to any one of the functions $K_0$ to $K_3$.

Thus, when the vehicle speed is not more than the threshold, the driving support apparatus 1 sets the reaction force of the accelerator pedal 27 or the steering wheel 29 to a larger value than when no moving object is detected.

The situations where a large reaction force is required to be determined for the accelerator pedal 27 or the steering wheel 29 are mostly the situations where the vehicle travels at a low speed, such as when the vehicle starts traveling or turns left or right.

When the vehicle speed is not more than a threshold, the driving support apparatus 1 sets the reaction force of the accelerator pedal 27 or the steering wheel 29 to a larger value than when no moving object is detected. Thus, the reaction force of the accelerator pedal 27 or the steering wheel 29 can be set to a larger value in a situation where the necessity is high.

(1H) If the vehicle position corresponds to a specific position, the driving support apparatus 1 may apply the retraction speed of the brake pedal 25 to any one of the functions $K_0$ to $K_3$ to set a reaction force of the accelerator pedal 27 or the steering wheel 29.

If the detected vehicle position does not correspond to a specific position, the driving support apparatus 1 resets the reaction force of the accelerator pedal 27 or the steering wheel 29 to the default value. The default value is smaller than the value obtained by applying the retraction speed of the brake pedal 25 to any one of the functions $K_0$ to $K_3$.

Thus, if the vehicle position corresponds to a specific position, the driving support apparatus 1 sets the reaction force of the accelerator pedal 27 or the steering wheel 29 to a larger value than when no moving object is detected.

The situations where a large reaction force is required to be determined for the accelerator pedal 27 or the steering wheel 29 are mostly the situations where the vehicle is located at a specific position, such as an intersection.

If the vehicle position corresponds to a specific position, the driving support apparatus 1 sets the reaction force of the accelerator pedal 27 or the steering wheel 29 to a larger value than when no moving object is detected. Thus, the driving support apparatus 1 can set a reaction force of the accelerator pedal 27 or the steering wheel 29 to a larger value in a situation where the necessity is high.

(1I) The retraction speed calculation unit 9 calculates an average value or a maximum value of the retraction speeds of the brake pedal 25 in a predetermined period. The driving operation device setting unit 11 sets the reaction force of the accelerator pedal 27 or the steering wheel 29 to a larger value as the average value or the maximum value becomes larger. Thus, even when the instantaneous retraction speed of the brake pedal 25 temporarily varies, the reaction force of the accelerator pedal 27 or the steering wheel 29 can be set to an appropriate value.

(1J) After lapse of a predetermined period from completing the operation of the brake pedal 25, the driving operation device setting unit 11 resets the reaction force of the accelerator pedal 27 or the steering wheel 29 to the default value. Therefore, uneasiness that the driver would otherwise feel can be minimized.

OTHER EMBODIMENTS

An embodiment of the present disclosure has been described so far, but the present disclosure should not be limited to the embodiment described above and can be implemented in various modes.

(1) The functions $K_0$ to $K_3$ may not be linear functions. For example, in FIG. 4, the functions $K_0$ to $K_3$ may be those which are expressed by curved lines, stepped lines, or the like.

(2) At step 17, the driving operation device for which a reaction force is set may be other components than the accelerator pedal 27 and the steering wheel 29. The driving operation device may, for example, be a shift lever, an operating switch for a direction indicator, an operating switch for a wiper, or the like.

(3) The function $K_B$ may not be a linear function. For example, in FIG. 5, the function $K_B$ may be one expressed by a curved line, a stepped line, or the like.

(4) After step 4, control may proceed to step 15. In other words, the processing such as of detecting a moving object are optional. In this case, at step 17, the reaction force of the accelerator pedal 27 or the steering wheel 29 may be set by using one function. Similar to the functions $K_0$ to $K_3$, the one function may be a function, for example, which defines a reaction force of $F_d$ when the retraction speed is 0, and defines a larger reaction force as the retraction speed becomes higher.

(5) If an affirmative determination is made at step 6, any one of the risk levels may always be set and then control may proceed to step 15. In other words, the determination as to whether the moving object collides with the vehicle, or the processing such as of calculating a time to collision may be eliminated.

(6) If an affirmative determination is made at step 8, any one of the risk levels may always be set and then control may proceed to step 15. In other words, the processing such as of calculating a time to collision are optional.

(7) Step 1 or step 2 are optional. In other words, control may proceed to step 3, irrespective of the vehicle speed.

(8) If an affirmative determination is made at step 2, control may always proceed to step 5. In other words, control may proceed to step 5, irrespective of the vehicle position.

(9) Steps 1 to 4 are optional. In other words, control may proceed to step 5, irrespective of the vehicle speed or position.

(10) The reaction force of the brake pedal 25 may be fixed, irrespective of the retraction speed of the brake pedal 25.

(11) The specific position may be one which is other than an intersection. For example, the specific position may be an exit or the like of a parking lot.

(12) In each embodiment described above, a plurality of functions of one component may be implemented by a plurality of components, or one function of one component may be implemented by a plurality of components. Alternatively, a plurality of functions of a plurality of components may be implemented by one component, or one function implemented by a plurality of components may be implemented by one component. Alternatively, a part of the configuration may be omitted from each embodiment described above. Alternatively, at least a part of the configuration of an embodiment described above may be added to or replaced by the configuration of another embodiment described above. It should be noted that any mode encompassed by the technical idea specified by the language of the claims is an embodiment of the present disclosure.

(13) In addition to the driving support apparatus 1 described above, the present disclosure may be implemented in various modes such as a system comprising the driving support apparatus 1 as a component, programs for causing a computer to function as the driving support apparatus 1, a non-transitory tangible recording medium, such as a semiconductor memory, in which the programs are recorded, and methods of supporting vehicle driving.

What is claimed is:

1. A driving support apparatus comprising:
a brake pedal detection unit, performed by a microcomputer, that detects an operation amount of a brake pedal of a vehicle;
a retraction speed calculation unit, performed by a microcomputer, that calculates a retraction speed of the brake pedal, based the operation amount of the brake pedal detected by the brake pedal detection unit; and
a driving operation device setting unit, performed by a microcomputer, that sets a reaction force exerted by a driving operation device; wherein:
the driving operation device setting unit sets a reaction force exerted by the driving operation device to a larger value as the retraction speed calculated by the retraction speed calculation unit becomes higher such that the reaction force is set to a first value in response to a first retraction speed value, the reaction force is set to a second value higher than the first value in response to a second retraction speed value that is higher than the first retraction speed value, and the reaction force is set to a third value higher than the second value in response to a third retraction speed value that is higher than the second retraction speed value.

2. The driving support apparatus according to claim 1, wherein
the driving operation device is an acceleration pedal or a steering wheel.

3. The driving support apparatus according to claim 1, further comprising:

a brake pedal setting unit, performed by a microcomputer, that sets a reaction force of the brake pedal, wherein the brake pedal setting unit sets a reaction force of the brake pedal to a smaller value as the retraction speed calculated by the retraction speed calculation unit becomes higher.

4. The driving support apparatus according to claim 1, further comprising:

a moving object detection unit, performed by a microcomputer, that detects a moving object, wherein when a moving object is detected, the driving operation device setting unit sets a reaction force exerted by the driving operation device to a larger value than when no moving object is detected.

5. The driving support apparatus according to claim 4, further comprising:

a risk calculation unit, performed by a microcomputer, that calculates a risk of future collision of the vehicle with the moving object detected by the moving object detection unit, wherein the driving operation device setting unit sets a reaction force exerted by the driving operation device to a larger value as the risk calculated by the risk calculation unit becomes higher.

6. The driving support apparatus according to claim 4, further comprising:

a time-to-collision calculation unit, performed by a microcomputer, that calculates a time to collision that is a duration of time before the vehicle collides with the moving object detected by the moving object detection unit, wherein the driving operation device setting unit sets a reaction force exerted by the driving operation device to a larger value as the time to collision calculated by the time-to-collision calculation unit becomes shorter.

7. The driving support apparatus according to claim 4, further comprising:

a vehicle speed detection unit, performed by a microcomputer, that detects a vehicle speed of the vehicle, wherein when the vehicle speed calculated by the vehicle speed detection unit is not more than a threshold set in advance, the driving operation device setting unit sets a reaction force exerted by the driving operation device to a larger value than when no moving object is detected.

8. The driving support apparatus according to claim 4, further comprising:

a vehicle position acquisition unit, performed by a microcomputer, that acquires a position of the vehicle, wherein when the vehicle position acquired by the vehicle position acquisition unit corresponds to a specific position determined in advance, the driving operation device setting unit sets a reaction force exerted by the driving operation device to a larger value than when no moving object is detected.

9. The driving support apparatus according to claim 8, wherein the specific position includes a position of an intersection.

10. The driving support apparatus according to claim 1, wherein the retraction speed calculation unit, performed by a microcomputer, calculates an average value or a maximum value of retraction speeds of the brake pedal in a predetermined period; and the driving operation device setting unit, performed by a microcomputer, sets a reaction force exerted by the driving operation device to a larger value as the average value or the maximum value becomes larger.

11. The driving support apparatus according to claim 1, wherein the driving operation device setting unit, performed by a microcomputer, resets the reaction force exerted by the driving operation device after lapse of a predetermined period from completing operation of the brake pedal.

* * * * *